(12) United States Patent
Passey et al.

(10) Patent No.: US 7,551,572 B2
(45) Date of Patent: Jun. 23, 2009

(54) SYSTEMS AND METHODS FOR PROVIDING VARIABLE PROTECTION

(75) Inventors: Aaron J. Passey, Seattle, WA (US); Neal T. Fachan, Seattle, WA (US)

(73) Assignee: Isilon Systems, Inc., Seattle, WA (US)

( * ) Notice: Subject to any disclaimer, the term of this patent is extended or adjusted under 35 U.S.C. 154(b) by 585 days.

(21) Appl. No.: 11/256,410

(22) Filed: Oct. 21, 2005

(65) Prior Publication Data

US 2007/0091790 A1 Apr. 26, 2007

(51) Int. Cl.
*H04L 12/28* (2006.01)
(52) U.S. Cl. .................................. 370/256; 370/382
(58) Field of Classification Search ............. 370/256, 370/408, 379, 382, 217
See application file for complete search history.

(56) References Cited

U.S. PATENT DOCUMENTS

| | | | |
|---|---|---|---|
| 5,163,131 A | 11/1992 | Row et al. |
| 5,181,162 A | 1/1993 | Smith et al. |
| 5,230,047 A | 7/1993 | Frey et al. |
| 5,251,206 A | 10/1993 | Calvignac et al. |
| 5,258,984 A | 11/1993 | Menon et al. |
| 5,403,639 A | 4/1995 | Belsan et al. |
| 5,548,724 A | 8/1996 | Akizawa et al. |
| 5,596,709 A | 1/1997 | Bond et al. |
| 5,657,439 A | 8/1997 | Jones et al. |
| 5,668,943 A | 9/1997 | Attanasio et al. |
| 5,696,895 A | 12/1997 | Hemphill et al. |
| 5,734,826 A | 3/1998 | Olnowich et al. |
| 5,761,659 A | 6/1998 | Bertoni |
| 5,774,643 A | 6/1998 | Lubbers et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,933,834 A | 8/1999 | Aichelen |
| 5,943,690 A | 8/1999 | Dorricott et al. |

(Continued)

FOREIGN PATENT DOCUMENTS

EP    0774723    5/1997

(Continued)

OTHER PUBLICATIONS

Nov. 15, 2002 International Search Report PCT/US02/24728.

(Continued)

*Primary Examiner*—Kwang B Yao
*Assistant Examiner*—Andrew Lai
(74) *Attorney, Agent, or Firm*—Knobbe, Martens, Olson & Bear, LLP.

(57) ABSTRACT

The systems and methods maintain varying protection levels of related objects, such as when nodes of a data structure are protected at the same or greater protection level as their children nodes. In one embodiment, the nodes store data to track protection levels of their children nodes.

11 Claims, 8 Drawing Sheets

U.S. PATENT DOCUMENTS

| | | | |
|---|---|---|---|
| 5,996,089 A | 11/1999 | Mann | |
| 6,029,168 A | 2/2000 | Frey | |
| 6,038,570 A | 3/2000 | Hitz et al. | |
| 6,044,367 A | 3/2000 | Wolff | |
| 6,055,543 A | 4/2000 | Christensen et al. | |
| 6,070,172 A | 5/2000 | Lowe | |
| 6,081,883 A | 6/2000 | Popelka et al. | |
| 6,108,759 A | 8/2000 | Orcutt et al. | |
| 6,117,181 A | 9/2000 | Dearth et al. | |
| 6,122,754 A | 9/2000 | Litwin et al. | |
| 6,138,126 A | 10/2000 | Hitz et al. | |
| 6,154,854 A | 11/2000 | Stallmo | |
| 6,173,374 B1 | 1/2001 | Heil et al. | |
| 6,209,059 B1 | 3/2001 | Ofer et al. | |
| 6,219,693 B1 | 4/2001 | Napolitano et al. | |
| 6,321,345 B1 | 11/2001 | Mann | |
| 6,334,168 B1 | 12/2001 | Islam et al. | |
| 6,353,823 B1 | 3/2002 | Kumar | |
| 6,384,626 B2 | 5/2002 | Tsai et al. | |
| 6,385,626 B1 | 5/2002 | Tamer et al. | |
| 6,397,311 B1 | 5/2002 | Capps | |
| 6,434,574 B1 | 8/2002 | Day et al. | |
| 6,449,730 B2 | 9/2002 | Mann | |
| 6,453,389 B1 | 9/2002 | Weinberger et al. | |
| 6,457,139 B1 | 9/2002 | D'Errico et al. | |
| 6,502,172 B2 | 12/2002 | Chang | |
| 6,502,174 B1 | 12/2002 | Beardsley et al. | |
| 6,526,478 B1 | 2/2003 | Kirby | |
| 6,546,443 B1 | 4/2003 | Kakivaya et al. | |
| 6,557,114 B2 | 4/2003 | Mann | |
| 6,567,894 B1 | 5/2003 | Hsu et al. | |
| 6,567,926 B2 | 5/2003 | Mann | |
| 6,571,244 B1* | 5/2003 | Larson | 707/7 |
| 6,571,349 B1 | 5/2003 | Mann | |
| 6,574,745 B2 | 6/2003 | Mann | |
| 6,594,655 B2 | 7/2003 | Tal et al. | |
| 6,594,660 B1 | 7/2003 | Berkowitz et al. | |
| 6,598,174 B1 | 7/2003 | Parks et al. | |
| 6,618,798 B1 | 9/2003 | Burton et al. | |
| 6,662,184 B1 | 12/2003 | Friedberg | |
| 6,732,125 B1 | 5/2004 | Autrey et al. | |
| 6,848,029 B2 | 1/2005 | Coldewey | |
| 6,917,942 B1 | 7/2005 | Burns et al. | |
| 6,922,696 B1* | 7/2005 | Lincoln et al. | 707/101 |
| 6,934,878 B2 | 8/2005 | Massa et al. | |
| 6,940,966 B2 | 9/2005 | Lee | |
| 6,954,435 B2* | 10/2005 | Billhartz et al. | 370/252 |
| 7,007,044 B1 | 2/2006 | Rafert et al. | |
| 7,111,305 B2 | 9/2006 | Solter et al. | |
| 7,146,524 B2 | 12/2006 | Patel et al. | |
| 7,177,295 B1* | 2/2007 | Sholander et al. | 370/338 |
| 7,184,421 B1* | 2/2007 | Liu et al. | 370/338 |
| 7,240,235 B2 | 7/2007 | Lewalski-Brechter | |
| 7,257,257 B2 | 8/2007 | Anderson et al. | |
| 7,318,134 B1 | 1/2008 | Oliverira et al. | |
| 7,373,426 B2 | 5/2008 | Jinmei et al. | |
| 2001/0047451 A1 | 11/2001 | Noble et al. | |
| 2002/0035668 A1 | 3/2002 | Nakano et al. | |
| 2002/0055940 A1 | 5/2002 | Elkan | |
| 2002/0072974 A1 | 6/2002 | Pugliese et al. | |
| 2002/0095438 A1 | 7/2002 | Rising et al. | |
| 2002/0124137 A1 | 9/2002 | Ulrich et al. | |
| 2002/0138559 A1 | 9/2002 | Ulrich et al. | |
| 2002/0156840 A1 | 10/2002 | Ulrich et al. | |
| 2002/0156891 A1 | 10/2002 | Ulrich et al. | |
| 2002/0156973 A1 | 10/2002 | Ulrich et al. | |
| 2002/0156974 A1 | 10/2002 | Ulrich et al. | |
| 2002/0156975 A1 | 10/2002 | Ulrich et al. | |
| 2002/0161846 A1 | 10/2002 | Ulrich et al. | |
| 2002/0161850 A1 | 10/2002 | Ulrich et al. | |
| 2002/0161973 A1 | 10/2002 | Ulrich et al. | |
| 2002/0163889 A1 | 11/2002 | Yemini et al. | |
| 2002/0165942 A1 | 11/2002 | Ulrich et al. | |
| 2002/0166026 A1 | 11/2002 | Ulrich et al. | |
| 2002/0166079 A1 | 11/2002 | Ulrich et al. | |
| 2002/0169827 A1 | 11/2002 | Ulrich et al. | |
| 2002/0174295 A1 | 11/2002 | Ulrich et al. | |
| 2002/0174296 A1 | 11/2002 | Ulrich et al. | |
| 2002/0178162 A1 | 11/2002 | Ulrich et al. | |
| 2002/0191311 A1 | 12/2002 | Ulrich et al. | |
| 2002/0194523 A1 | 12/2002 | Ulrich et al. | |
| 2002/0194526 A1 | 12/2002 | Ulrich et al. | |
| 2002/0198864 A1 | 12/2002 | Ostermann et al. | |
| 2003/0005159 A1 | 1/2003 | Kumhyr | |
| 2003/0014391 A1 | 1/2003 | Evans et al. | |
| 2003/0033308 A1 | 2/2003 | Patel et al. | |
| 2003/0135514 A1 | 7/2003 | Patel et al. | |
| 2003/0163726 A1* | 8/2003 | Kidd | 713/200 |
| 2003/0172149 A1 | 9/2003 | Edsall et al. | |
| 2004/0003053 A1 | 1/2004 | Williams | |
| 2004/0024963 A1 | 2/2004 | Talagala et al. | |
| 2004/0153479 A1 | 8/2004 | Mikesell et al. | |
| 2004/0189682 A1 | 9/2004 | Troyansky et al. | |
| 2004/0199734 A1 | 10/2004 | Rajamani et al. | |
| 2004/0205141 A1 | 10/2004 | Goland | |
| 2004/0230748 A1 | 11/2004 | Ohba | |
| 2005/0066095 A1 | 3/2005 | Mullick et al. | |
| 2005/0114609 A1 | 5/2005 | Shorb | |
| 2005/0171960 A1 | 8/2005 | Lomet | |
| 2005/0171962 A1 | 8/2005 | Martin et al. | |
| 2005/0188052 A1 | 8/2005 | Ewanchuk et al. | |
| 2005/0289169 A1 | 12/2005 | Adya et al. | |
| 2006/0004760 A1 | 1/2006 | Clift et al. | |
| 2006/0059467 A1 | 3/2006 | Wong | |
| 2006/0074922 A1 | 4/2006 | Nishimura | |
| 2006/0095438 A1 | 5/2006 | Fachan et al. | |
| 2006/0101062 A1 | 5/2006 | Godman et al. | |
| 2006/0129584 A1 | 6/2006 | Hoang et al. | |
| 2006/0129631 A1 | 6/2006 | Na et al. | |
| 2006/0129983 A1 | 6/2006 | Feng | |
| 2006/0230411 A1 | 10/2006 | Richter et al. | |
| 2006/0277432 A1 | 12/2006 | Patel | |
| 2007/0091790 A1 | 4/2007 | Passey et al. | |
| 2007/0094269 A1 | 4/2007 | Mikesell et al. | |
| 2007/0094277 A1 | 4/2007 | Fachan et al. | |
| 2007/0094310 A1 | 4/2007 | Passey et al. | |
| 2007/0094431 A1 | 4/2007 | Fachan | |
| 2007/0094452 A1 | 4/2007 | Fachan | |
| 2007/0168351 A1 | 7/2007 | Fachan | |
| 2007/0171919 A1 | 7/2007 | Godman et al. | |
| 2007/0195810 A1 | 8/2007 | Fachan | |
| 2007/0233684 A1 | 10/2007 | Verma et al. | |
| 2007/0233710 A1 | 10/2007 | Passey et al. | |
| 2008/0021907 A1 | 1/2008 | Patel et al. | |
| 2008/0031238 A1 | 2/2008 | Harmelin et al. | |
| 2008/0044016 A1 | 2/2008 | Henzinger | |
| 2008/0046432 A1 | 2/2008 | Anderson et al. | |
| 2008/0046443 A1 | 2/2008 | Fachan et al. | |
| 2008/0046444 A1 | 2/2008 | Fachan et al. | |
| 2008/0046445 A1 | 2/2008 | Passey et al. | |
| 2008/0046475 A1 | 2/2008 | Anderson et al. | |
| 2008/0046476 A1 | 2/2008 | Anderson et al. | |
| 2008/0046667 A1 | 2/2008 | Fachan et al. | |
| 2008/0059541 A1 | 3/2008 | Fachan et al. | |
| 2008/0126365 A1 | 5/2008 | Fachan et al. | |
| 2008/0154978 A1 | 6/2008 | Lemar et al. | |
| 2008/0168458 A1 | 7/2008 | Fachan et al. | |

FOREIGN PATENT DOCUMENTS

| | | |
|---|---|---|
| WO | WO 00/57315 | 9/2000 |
| WO | WO 01/14991 | 3/2001 |
| WO | WO 01/33829 | 5/2001 |
| WO | WO 02/061737 | 8/2002 |

| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 International Search Report PCT/US03/36699.
Aug. 6, 2004 International Search Report PCT/US03/33704.
Philip A. Bernstein, Vassos Hadzilacos, and Nathan Goodman, *Concurrency Control and Recovery in Database Systems*, Addison-Wesley, 1987.
Birk, Y., *Deterministic load-balancing schemes for disk-based video-on-demand storage servers*, Mass Storage Systems 1995; Storage—At the Forefront of Information Infrastructures', Proceedings of the Fourteenth IEEE Symposium on Monterey, CA, Sep. 11-14, 1995, pp. 17-25.
Kenneth P. Birman, *Building Secure and Reliable Network Applications*, Manning, 1996, pp. 1-327.
Kenneth P. Birman, *Building Secure and Reliable Network Applications*, Manning, 1996, pp. 328-620.
Coulouris et al., *Distributed Systems Concepts and Design*, Addison-Wesley, Second Edition, 1994, pp. 353-371 and 377-405.
Jim Gray and Andreas Reuter, *Transaction Processing: Concepts and Techniques*, Morgan Kaufmann, 1993, pp. 1-328.
Jim Gray and Andreas Reuter, *Transaction Processing: Concepts and Techniques*, Morgan Kaufmann, 1993, pp. 329-664.
Jim Gray and Andreas Reuter, *Transaction Processing: Concepts and Techniques*, Morgan Kaufmann, 1993, pp. 665-1105.
Nancy A. Lynch, *Distributed Algorithms*, Morgan Kaufmann, 1996, pp. 1-409.
Nancy A. Lynch, *Distributed Algorithms*, Morgan Kaufmann, 1996, pp. 410-871.
Sape Mullender, editor, *Distributed Systems ($2^{nd}$ Ed.)*, ACM Press/Addison-Wesley Publishing Co., New York, NY, USA, 1993, pp. 1-327.
Sape Mullender, editor, *Distributed Systems ($2^{nd}$ Ed.)*, ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., *Transactional Information Systems: Theory, Algorithms, and the Practice of Concurrency Control and Recovery*, Morgan Kaufmann, 2002, pp. 1-450.
Gerhard Weikum, et al., *Transactional Information Systems: Theory, Algorithms, and the Practice of Concurrency Control and Recovery*, Morgan Kaufmann, 2002, pp. 451-863.
Sanjay Ghemawat et al., *The Google File System, Symposium on Operating Systems Principles*, Oct. 19-22, 2003, 15 pages, Bolton Landing, NY.
Pei Cao et al., *The TickerTAIP parallel RAID architecture*, 1993, 12 pages, Princeton, NJ.
Pei Cao et al., *The TickerTAIP parallel RAID architecture, ACM Transactions on Computer Systems*, vol. 12, No. 3, Aug. 1994, 34 pages, Palo Alto, California.
Bob Duzett, et al., *An Overview of the nCube 3 Supercomputer*, IEEE, Jul. 1992, pp. 458-464.
John Henry Hartman, *The Zebra Striped Network File System*, 1994, pp. 1-148, University of California at Berkeley.
Darrell D.E. Long et al., *Swift/RAID: A Distributed RAID System*, Computing Systems, vol. 7, No. 3 Summer 1994, pp. 333-359.
Michael Stonebraker et al., *Distributed Raid: A new Multiple copy Algorithm*, IEEE 1990, pp. 430-437, Berkeley, California.
United States Court of Appeals, Federal Circuit, *Seachange International, Inc. Vs. nCUBE, Corp.*, Oct. 26, 2004, 28 pages.
United States Court of Appeals, Federal Circuit, *Seachange International, Inc. Vs. C-Cor, Inc.*, Jun. 29, 2005, 22 pages.
United States District Court, Delaware, *Seachange International, Inc. Vs. nCUBE, Corp.*, Apr. 7, 2004, 13 pages.
United States District Court, Delaware, *Seachange International, Inc. Vs. nCUBE, Corp.*, Aug. 29, 2000, 12 pages.
European Search Report dated May 21, 2007 issued to EP application No. 02756944.1-2201.
Stallings, William, "Operating Systems," Prentice Hall, Fourth Edition, 2001, pp. 197-253 and 265-293.
Feb. 22, 2008 Int'l Search report PCT/US07/018326, 20 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2006 (including claim chart), 28 pages.
Arthur S. Rose, Letter to Steven M. Bauer, Jun. 22, 2007, 8 pages.
Todd A. Gerety, Letter to Arthur S. Rose, Jun. 26, 2007 (including exhibits listed separately), 1 page.
Isilon Systems, "Isilon IQ Plateform Overview", 4 pages (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems, 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
May 8, 2008 Int'l Search report PCT/US07/018324, 13 pages.
Michael Stonebraker et al., Distribtued Raid: A new Multiple copy Algorithm, IEEE 1990, Berkeley, California (pp. 430-434).
Levy E Ed—Institute of Electrical and Electronics Engineers: "Incremental restart (database management)" Proceedings of the International Conference on Data Engineering. Kobe, JP, Apr. 8-12, 1991; [Proceedings of the International Conference on Data Engineering], Los Alamitos, IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of the Euromicro Workshop Onmultimedia and Telecommunications, vol. 2, Sep. 5, 2000, pp. 96-101.

* cited by examiner

SYSTEMS AND METHODS FOR PROVIDING VARIABLE PROTECTION

REFERENCE TO RELATED APPLICATIONS

The present disclosure relates to U.S. patent application Ser. No. 11/255,817, titled "SYSTEMS AND METHODS FOR DISTRIBUTED SYSTEM SCANNING," U.S. patent application Ser. No. 11/255,346, titled "SYSTEMS AND METHODS FOR MANAGING CONCURRENT ACCESS REQUESTS TO A SHARED RESOURCE," U.S. patent application Ser. No. 11/255,818, titled "SYSTEMS AND METHODS FOR MAINTAINING DISTRIBUTED DATA," U.S. patent application Ser. No. 11/256,317, titled "SYSTEMS AND METHODS FOR USING EXCITEMENT VALUES TO PREDICT FUTURE ACCESS TO RESOURCES," and U.S. patent application Ser. No. 11/255,337, titled "SYSTEMS AND METHODS FOR ACCESSING AND UPDATING DISTRIBUTED DATA," each filed on Oct. 21, 2005 and each hereby incorporated by reference herein in their entirety.

FIELD OF THE INVENTION

This invention relates to systems and methods for providing protection within a data structure where the objects of the data structure have different protection requirements.

BACKGROUND

Various protection techniques may be used to protect data. These techniques may include, for example, error correction, redundancy, and mirroring so that if one set of the data is not inaccessible, the data can be recovered. It is often difficult to determine what level of protection is required for the data.

SUMMARY

Systems and methods are disclosed that determine what level of protection is required for a data structure where the objects of the data structure have different protection requirements. In one embodiment, the data structure is protected by protecting objects of the data structure at the same or greater protection level as their children. In another embodiment, the objects store data to track the protection requirements of their children.

In one embodiment, a method is provided that protects data of variable protection levels. The method may include, for each leaf node, determining a protection level for the leaf node; for each non-leaf node, determining a protection level for each non-leaf node based on a maximum of the protection levels of each child of each of the non-leaf nodes; protecting each of the leaf nodes at the protection level determined for each of the leaf nodes; and protecting each of the non-leaf nodes at the protection level determined for each of the non-leaf nodes.

In another embodiment, a protection system is provided for protecting data of variable protection levels. The system may include a set protection level module configured to determine protection levels for each of a set of leaf nodes and determine protection levels for each of a set of non-leaf nodes based on a maximum of the protection levels of children of each of the non-leaf nodes; and an implement protection level module, in communication with the set protection level module, configured to protect each leaf node at the determined protection level and protect each non-leaf node at the determined protection level.

In another embodiment, a method is provided that updates data of variable protection levels. The method may include determining a maximum protection level of an updated leaf node, wherein the updated leaf node comprises a plurality of data sets; protecting the updated leaf node at the maximum protection level; determining a count of data sets that are at the maximum protection level; and for each ascendant of the updated leaf node, determining a maximum protection level of each ascendant, determining a count of children of each ascendant that are at the maximum protection level, and protecting each ascendant at the maximum protection level.

In another embodiment, a system is provided for updating data stored using variable protection levels. The system may include an update leaf module configured to determine a maximum protection level of an updated leaf node, wherein the updated leaf node comprises a plurality of data sets, and protect the updated leaf node at the maximum protection level; an update non-leaf module in communication with the update leaf module, the update non-leaf module configured to, for each ascendant of the updated leaf node, determine a maximum protection level of each ascendant and protect each ascendant at a protection level greater than or equal to the maximum protection level.

For purposes of summarizing this invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF PREFERRED EMBODIMENTS

Systems and methods which represent one embodiment and example application of the invention will now be described with reference to the drawings. Variations to the systems and methods which represent other embodiments will also be described.

For purposes of illustration, some embodiments will be described in the context of a tree and example environments in which the tree may be used will also be described. The inventors contemplate that the present invention is not limited by the type of environment in which the systems and methods are used, and that the systems and methods may be used in various environments. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates the figure in which the element first appears.

I. Overview

The systems and methods of the present invention provide protection for data structures with nodes of various protection levels. In one embodiment, data is stored in a tree where nodes without children are referred to as leaf nodes and the top node of the tree is referred to as a root node. Nodes of the tree may be protected at various protection levels. In one embodiment, the various protection levels represent the number of mirrored copies of the nodes.

In some embodiments, the nodes have at least the maximum protection level as their children. Accordingly, when a modification is made to one node in a tree, the protection level of that node and its ancestors (e.g., parent node, grandparent node, etc.) are checked to determine whether their protection levels need to be updated. For example, when a node is added the tree, the protection level for that node is determined, the appropriate number of copies of the node are created, and the node's ancestors are checked to determine whether their protection levels need to be updated. When a node is deleted from the tree, the node's ascendants are checked to determine whether their protection levels need to be updated.

II. Mirrored Tree

A. Example Mirrored Tree

Figure 1A:
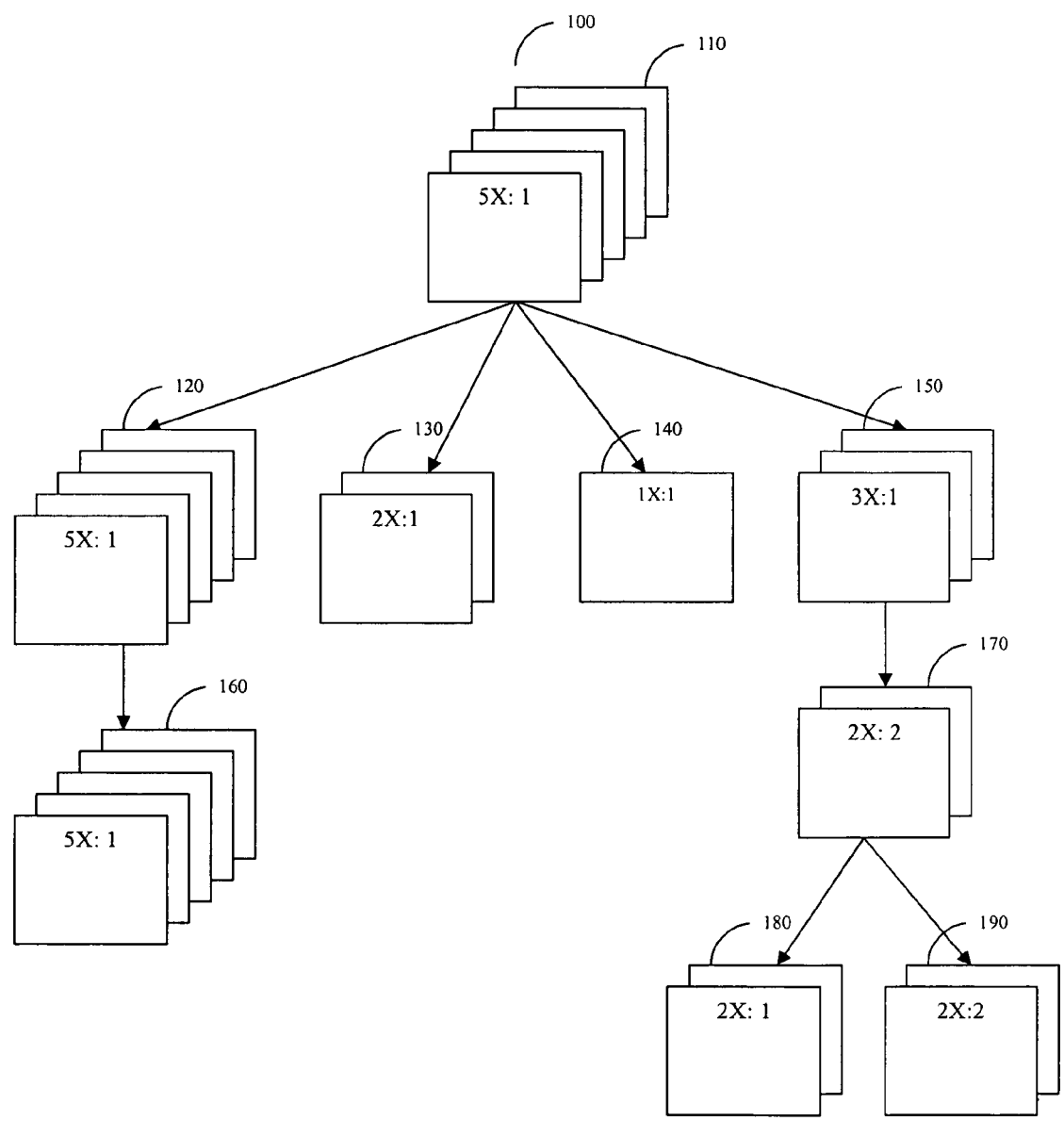
FIG. 1A illustrates one embodiment of a high-level block diagram of one embodiment of a mirrored tree.

FIG. 1A illustrates an example mirrored tree 100 that includes nine nodes 110, 120, 130, 140, 150, 160, 170, 180, 190. Node 110 is the root node, and nodes 130, 140, 160, 180, 190 are leaf nodes (because they have no children). Root node 110, node 120, and node 160 are mirrored five times (e.g., 5×); node 150 and node 170 are mirrored three times (e.g., 3×); node 130, node 180, and node 190 are mirrored two times (e.g., 2×); and node 140 is mirrored one time (e.g., 1×). In one embodiment, mirrored copies of a node are distributed and stored among a set of devices.

In accordance with one embodiment, each node is at a protection level at least the maximum protection level of is children. For example, node 170 has two children, both with protection level 2× 180. Thus, the maximum protection level of the children of root node 170 is 2×. Accordingly, node 170 is protected at protection level 2× which is at least the maximum protection level of its children. As another example, root node 110 has four children, one with protection level 5× 120, one with protection level 3× 150, one with protection level 2× 130, and one with protection level 1× 140. Thus, the maximum protection level of the children of root node 110 children is 5×. Accordingly, root node 110 is protected at protection level 5× which is at least the maximum protection level of its children.

B. Protection Level Data

In one embodiment, the different protection levels are managed using protection level information. Protection level information may include, for example, the protection level of a node's children, the maximum protection level of the node's children, the count of children at each protection level, the count of the children with the maximum protection level, protection levels of data entries, the count of data entries at one or more protection levels, and so forth. In FIG. 1A, the protection level information includes the maximum protection level of the node's children followed by the count of the children with the maximum protection level as follows:

[maximum protection level]: [count of children with the maximum protection level]

For example, the protection level information for the root node 170 is: 5×:1 indicating that the maximum protection level of the root node's children is 5× and the number of children at that protection level is 1. As another example, the protection level information for the node 170 is: 2×:2 indicating that the maximum protection level of the root node's children is 2× and the number of children at that protection level is 2. In FIG. 1A, the leaf nodes provide the maximum protection level of their data entries and the number of data entries at that protection level.

Figure 1B:
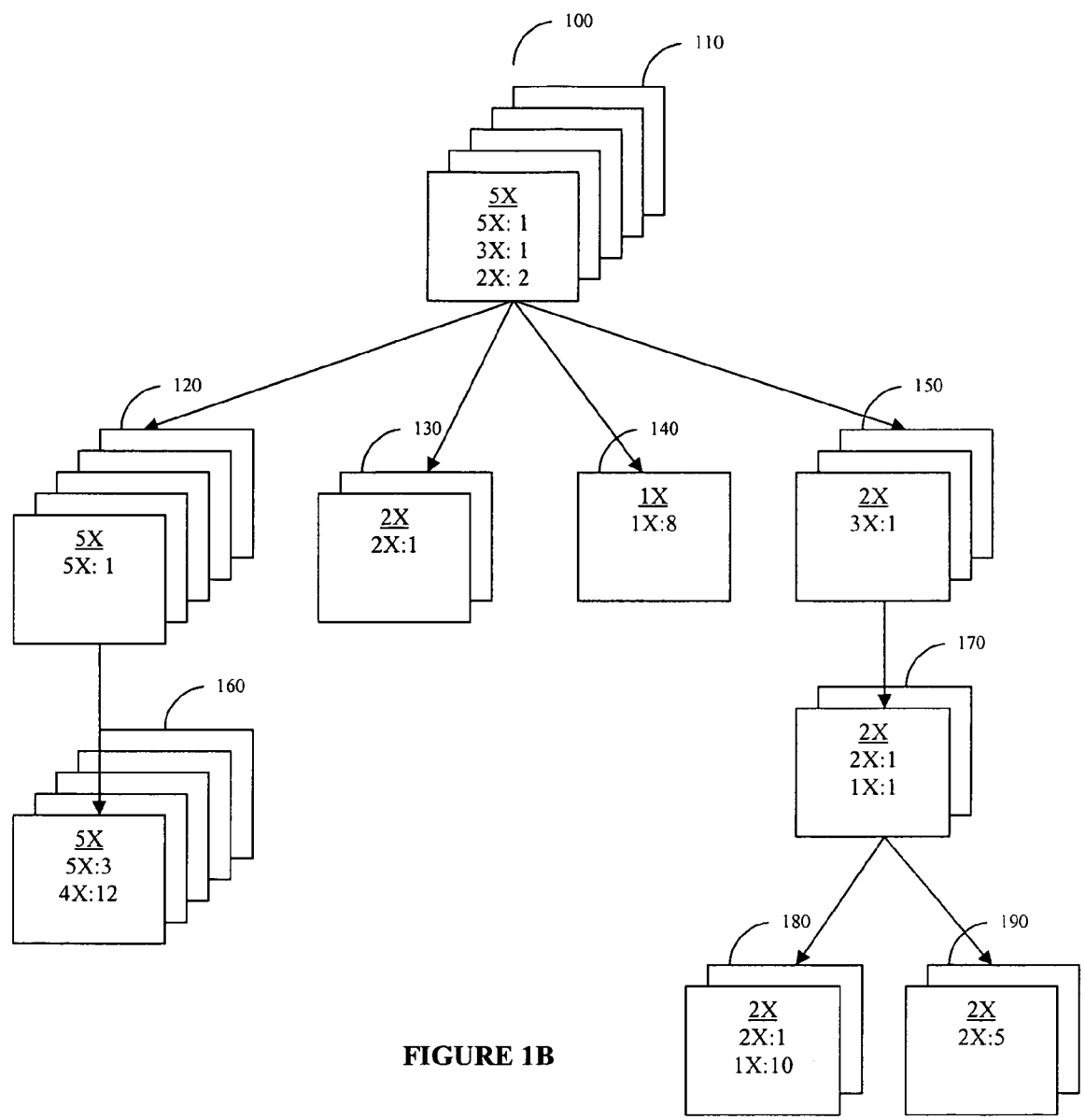
FIG. 1B illustrates another embodiment of a high-level block diagram of one embodiment of a mirrored tree.

A variety of protection level information may be used. For example, FIG. 1B illustrates the same tree 100 wherein different protection level information is stored. In FIG. 1B, the protection level information includes protection level of the node, the protection levels used by the children, and the count of the children with the each of the protection levels.

For example, the protection level information for the root node 170 includes: 5× indicating that the root node 110 is stored at 5×; 5×:1 indicating that one of the root node's children is stored at the protection level 5×; 3×:1 indicating that one of the root node's children is stored at the protection level 3×; 2×:1 indicating that one of the root node's children is stored at the protection level 2×; and 1×:1 indicating that one of the root node's children is stored at the protection level 5×. As another example, the protection level information for the node 170 includes: 2× indicating that node 170 is stored at protection level 2×; 2×:2 indicating that two of the root node's children are stored at protection level 2×. From this information, the total number of children may be determined by summing the counts. Similarly, protection information for the leaf nodes includes the protection levels of the data entries as well as the number of data entries at that protection level. In the example, the leaf nodes may store multiple data entries, though it is recognized that in other embodiments, the leaf nodes may store one data entry or a fixed number of data entries.

C. Nodes

1. Leaf Nodes

The protection level of the leaf nodes may be predetermined, may be set for each leaf node, and/or may be set for a subset of leaf nodes. In addition, a minimum protection level of the leaf nodes may also be set. In one embodiment, where the leaf nodes store data, the protection level may be determined by using the protection level of the data stored in or referenced by the leaf node. For example, in one embodiment, if leaf node 180 includes two sets of data, Data A and Data B, the protection level of leaf node 180 is MAX (Data A, Data B).

In one embodiment, the protection level information for the leaf node indicates the maximum protection level of the data stored in or referenced by the leaf node. In other embodiments, the protection level information for the leaf node indicates the protection level of the leaf node, such as in FIGS. 1A and 1B. In other embodiments, the protection level information for the leaf node is NULL.

2. Non-Leaf Nodes

In order to preserve the protection of the data sets, non-leaf nodes are protected at a level at least that of the maximum protection level of the children of the non-leaf nodes. For example, the protection level of root node 110 is MAX (Node 120, Node 130, Node 140, Node 150)=MAX (5×, 2×, 1×, 3×)=5×. The protection level of node 12 is MAX (Node 160)=MAX (5×)=5×. The protection level of node 150 is MAX (Node 170)=MAX (3×)=3×. The protection level of node 170 is MAX (Node 180, Node 190)=MAX (2×, 2×)=2×.

In one embodiment, the protection level information for the non-leaf nodes may include the protection level of a node's children, the maximum protection level of the node's children, the count of children at each protection level, the count of the children with the maximum protection level, and so forth. It is recognized that a variety of protection level information could be used. For example, the protection level information could include the maximum protection level without any counts.

It is recognized that in other embodiments, the tree may track other protection information in addition to the maximum protection level and the maximum protection level count. For example, the tree may also track information about the protection levels of each of the node's children in addition to or instead of the maximum protection level and keep a count of the number of children at each protection level. In other embodiments, the tree may also store information about a subset of the protection levels and counts related to those protection levels.

D. Various Embodiments

It is recognized that a variety of embodiments may be used to implement a data structure with variable protection and that the example provided herein are meant to illustrate and not limit the scope of the invention.

1. Data Structures

While the examples discuss the data as being stored in a tree, it is recognized that a variety of data structures known to those of ordinary skill in the art may be used to organize the data including, for example, balanced trees, binary trees, other trees, graphs, linked lists, heaps, stacks, and so forth.

2. Protection Techniques

In one embodiment, data may be protected using a variety of protection schemes, such as, error correction, redundancy, and so forth. The examples discussed below illustrate an embodiment in which the tree is protected using mirroring, though it is recognized that other protection techniques may be used.

While some mirrored trees may be implemented such that the entire tree is always mirrored the same number of times (e.g., all of the nodes are mirrored two times; all of the nodes are mirrored five times, etc.), such an implementation often requires storing extra, unnecessary copies of nodes. Thus, the systems and methods described herein allow different nodes of the tree to be stored using different protection levels while maintaining the protection levels of descendant nodes. In addition, nodes that do not need any protection do not have to use any protection level.

It is recognized that a combination of techniques may be used to implement the tree. For example, the tree may require that every node is mirrored at least two times but that additional mirroring may be implemented to protect nodes that have children that are mirrored more than two times.

III. Operations

Operations for checking the protection information, modifying protection information, adding an item, and removing an item are set forth below. It is recognized that examples below provide various embodiments of the processes and that other embodiments may be used.

A. Check Protection Information of a Node

To check the protection information of a node of a mirrored tree, a node is received and the maximum protection count is determined. If the maximum protection count for the node is zero, then the maximum protection level of the node's items are determined, and the count is updated to reflect the number of items at that protection level. In one embodiment, items for non-leaf nodes are its children nodes, and items for leaf nodes are the data entries in the leaf node.

One example set of pseudocode to check, and if necessary, update the protection information of a node is as follows:

```
fixup_node(node) {
    if (node.mp_count == 0) {
        node.max_protection = MAX(items' protections)
        node.mp_count = count(items at max protection)
    }
    if (node.current_protection != node.max_protection) {
        set_mirror_count(node, node.max_protection)
        node.current_protection = node.max_protection
        if (node != root)
            modify_item_protection(get_parent(node), &node,
                node.max_protection);
    }
}
```

Figure 2:
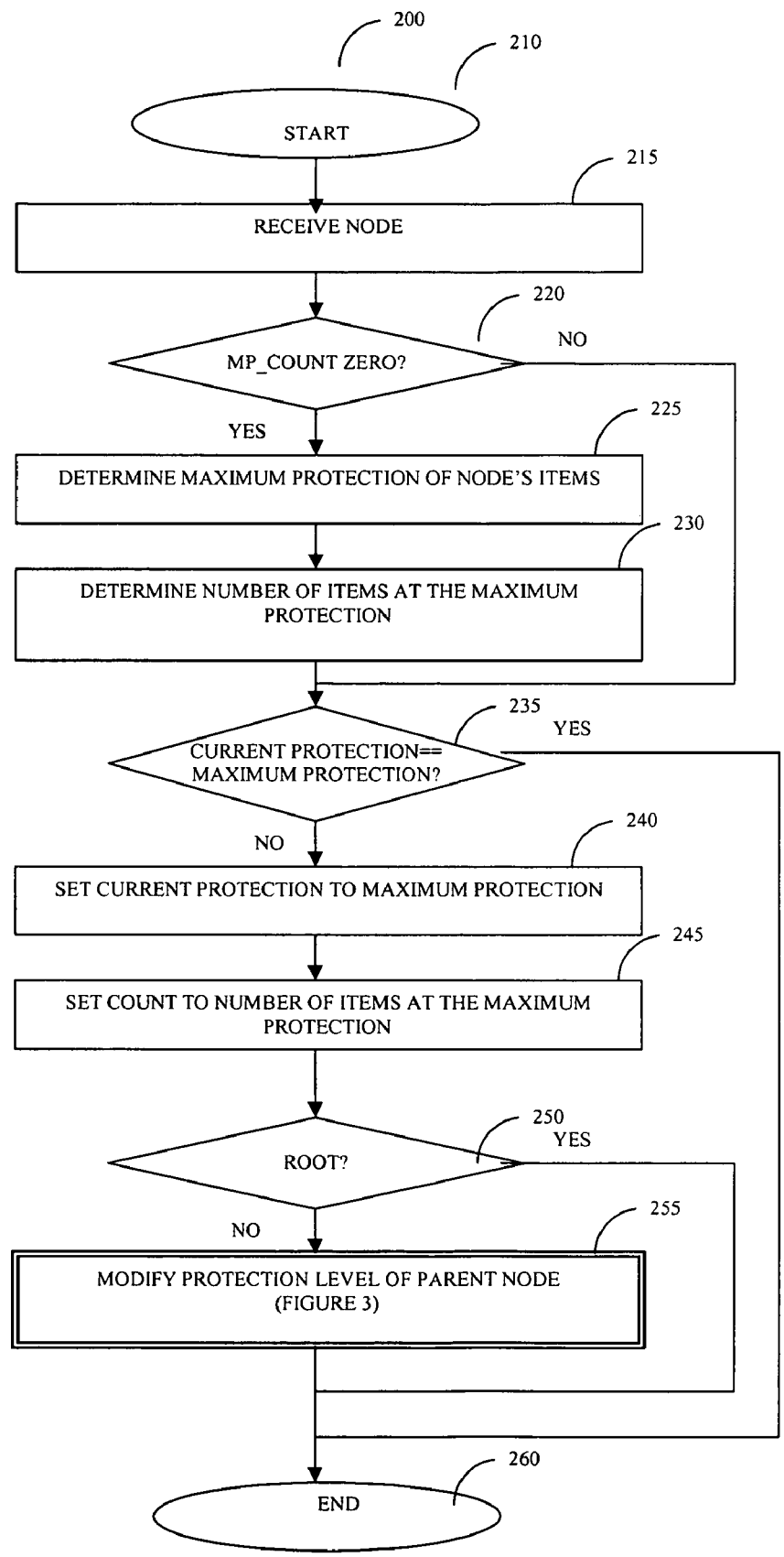
FIG. 2 illustrates one embodiment of a flow chart of a check protection information process.

FIG. 2 illustrates one embodiment of a check process 200. Beginning at a start state 210, the check process 200 proceeds to the next block 215. In block 215, the check process 200 receives a node. It is recognized that in some embodiment the check process 200 may receive a reference to the node, information from the node, a pointer to the node, and so forth. Proceeding to block 220, the check process 200 determines whether the node's count of maximum protection items is zero. If not, then the check process 200 proceeds to block 235. If so, then the check process 200 determines the maximum protection of the node's items 225 and the number of items at that maximum protection 230.

Proceeding to the next block 235, the check process 200 determines whether the current protection of the node is the same as the maximum protection. If so, then the check process 200 proceeds to an end state 260. If not, then the check process 200 sets the current protection of the node to the maximum protection 240 and sets the current maximum count to the count of the number of items at that maximum protection 245, and proceeds to block 250.

In block 250, the check process 200 determines whether the current node is the root. If so, the check process 200 proceeds to the end state 260. If not, then the check process 200 calls the modify process to modify the protection information of the node's parent using the node and the new maximum protection and proceeds to the end state 260.

B. Modifying Protection Information of an item

To modify protection information of an item, a node, an item is received, and a new protection is received. If the item's previous protection is the same as the node's protection, then the node's maximum protection level count is decremented. If the new protection is the same as the node's protection, then the node's maximum protection level count is incremented. If the new protection is higher than the node's maximum protection, then the node's protection is set to the new protection, and the node's maximum protection count is set to 1. Then, the check protection process is called on the node.

One example set of pseudocode to modify protection information is as follows:

```
modify_item_protection(node, item, new_prot) {
    if (item.protection == node.max_protection)
        --node.mp_count
    if (new_prot == node.max_protection) {
        ++node.mp_count
    } else if (new_prot > node.max_protection) {
        node.max_protection = new_prot
        node.mp_count = 1
    }
    fixup_node(node)
}
```

Figure 3:
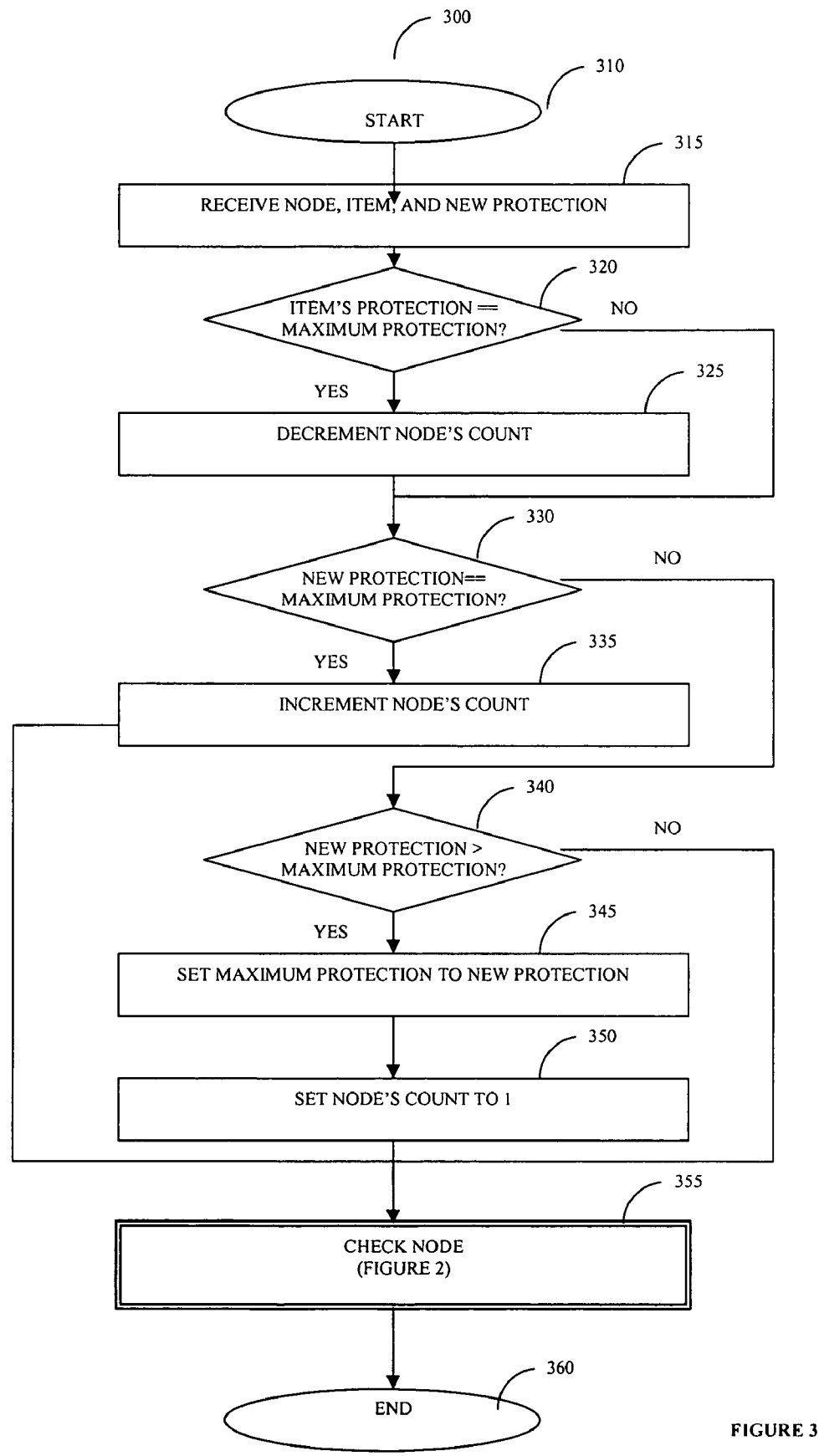
FIG. 3 illustrates one embodiment of a flow chart of an add node process.

FIG. 3 illustrates one embodiment of a modify process 300. Beginning at a start state 310, the modify process 300 proceeds to the next block 315. In block 315, the modify process 300 receives a node, an item, and a new protection. It is recognized that in some embodiments, the modify process 300 may receive a reference to the node, information from the node, a pointer to the node, and so forth. Proceeding to block 320, the modify process 300 determines whether the node's maximum protection is equal to the item's protection. If not, then the modify process 300 proceeds to block 330. If so, then the modify process 300 decrements the node's count 325 and proceeds to block 330.

In block 330, the modify process 300 determines whether the new protection is the same as the node's maximum protection. If not so, then the modify process 300 proceeds to block 340. If so, then the modify process 300 increments the node's count 335 and proceeds to block 355.

In block 340, the modify process 300 determines whether the new protection is greater than the node's maximum protection. If not, then the modify process 300 proceeds to block 355. If so, then the modify process sets the node's maximum protection to the new protection 345, sets the node's count to 1, and proceeds to block 355.

In block 355, the modify process 300 calls the check process 200 with the node and proceeds to an end state 360.

C. Adding an Item

To add an item, a node and an item are received. The item is added to the node. For leaf nodes, this would include adding a data entry. For non-leaf nodes, this would include adding a child node. If the item's protection is the same as the node's protection, then the node's count is incremented. If the item's protection is greater than the node's protection, then the node's protection is set to the item's protection, the node's count is set to one, and protection information of the node is checked using, for example, the process described above.

One example set of pseudocode to add an item to the mirrored tree is as follows:

```
add_item(node, item) {
    add_item_to_node(node, item)
    if (item.protection == node.max_protection) {
        ++node.mp_count
    } else if (item.protection > node.max_protection) {
        node.max_protection = item.protection
        node.mp_count = 1
        fixup_node(node)
    }
}
```

Figure 4:
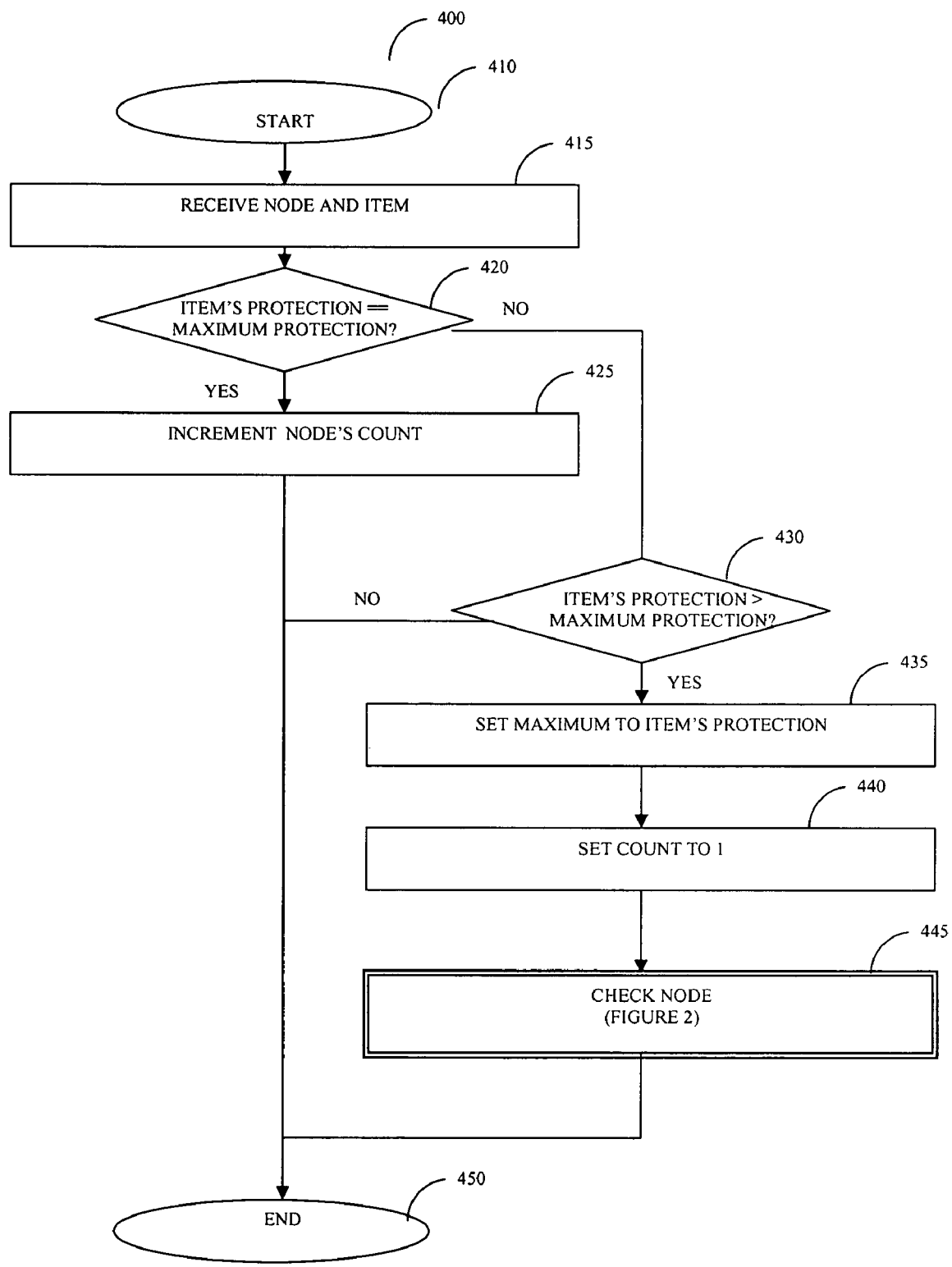
FIG. 4 illustrates one embodiment of a flow chart of a delete node process.

FIG. 4 illustrates one embodiment of an add process 400. Beginning at a start state 410, the add process 400 proceeds to the next block 415. In block 415, the add process 400 receives a node and an item. It is recognized that in some embodiment the add process 400 may receive a reference to the node and/or item, information from the node and/or item, a pointer to the node and/or item, and so forth. Proceeding to block 420, the add process 400 determines whether the item's protection is equal to the node's maximum protection. If not, then the add process 400 proceeds to block 430. If so, then the add process 400 increments the node's count 425 and proceeds to an end state 450.

In block 430, the add process 400 determines whether the item's protection is greater than the node's maximum protection. If not, then the add process 400 proceeds to the end state 450. If so, then the add process 400 sets the node's maximum protection to the item's protection 435, sets the node's count to 1 440, calls the check process 200 with the node 445, and proceeds to the end state 450.

D. Deleting an Item

To delete an item, a node and an item are received. The item is removed from the node. For leaf nodes this may include removing a data entry. For non-leaf nodes, this may include removing a child node. If the item's protection was the same as the node's protection, then the node's count is decremented. If the node's new count is zero, then the protection information of the node is checked using, for example, the process described above.

One example set of pseudocode to delete an item from the mirrored tree is as follows:

```
remove_item(node, item) {
    remove_item_from_node(node, item)
    if (item.protection == node.max_protection) {
        --node.mp_count
        if (node.mp_count == 0)
            fixup_node(node)
    }
}
```

Figure 5:
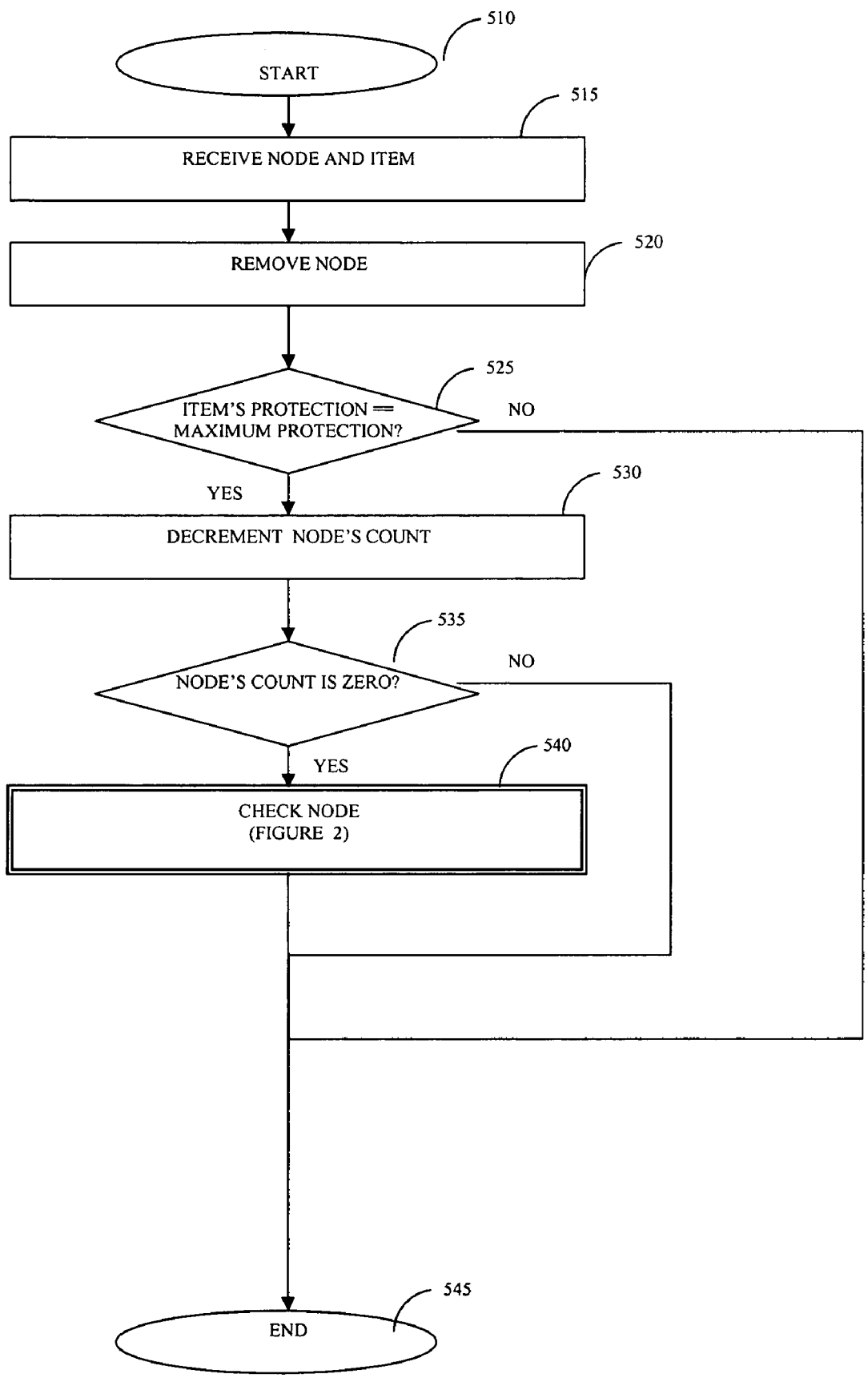
FIG. 5 illustrates one embodiment of a flow chart of a modify node process.

FIG. 5 illustrates one embodiment of a delete process 500. Beginning at a start state 510, the add process 500 proceeds to the next block 515. In block 515, the delete process 500 receives a node and an item. It is recognized that in some embodiment the add process 500 may receive a reference to the node and/or item, information from the node and/or item, a pointer to the node and/or item, and so forth. Proceeding to block 520, the delete process 500 removes the item from the node. Proceeding to block 525, the delete process determines whether the item's protection is equal to the node's maximum protection. If not, then the delete process 500 proceeds to an end state 540. If so, then the delete process 500 decrements the node's count 530, and proceeds to block 535. In block 535, the delete process 500 determines whether the node's count is zero. If not, then the delete process 500 proceeds to the end state. If so, then the delete process 500 calls the check process 200 with the node 540, and proceeds to the end state 540.

IV. Protection System

Figure 6:
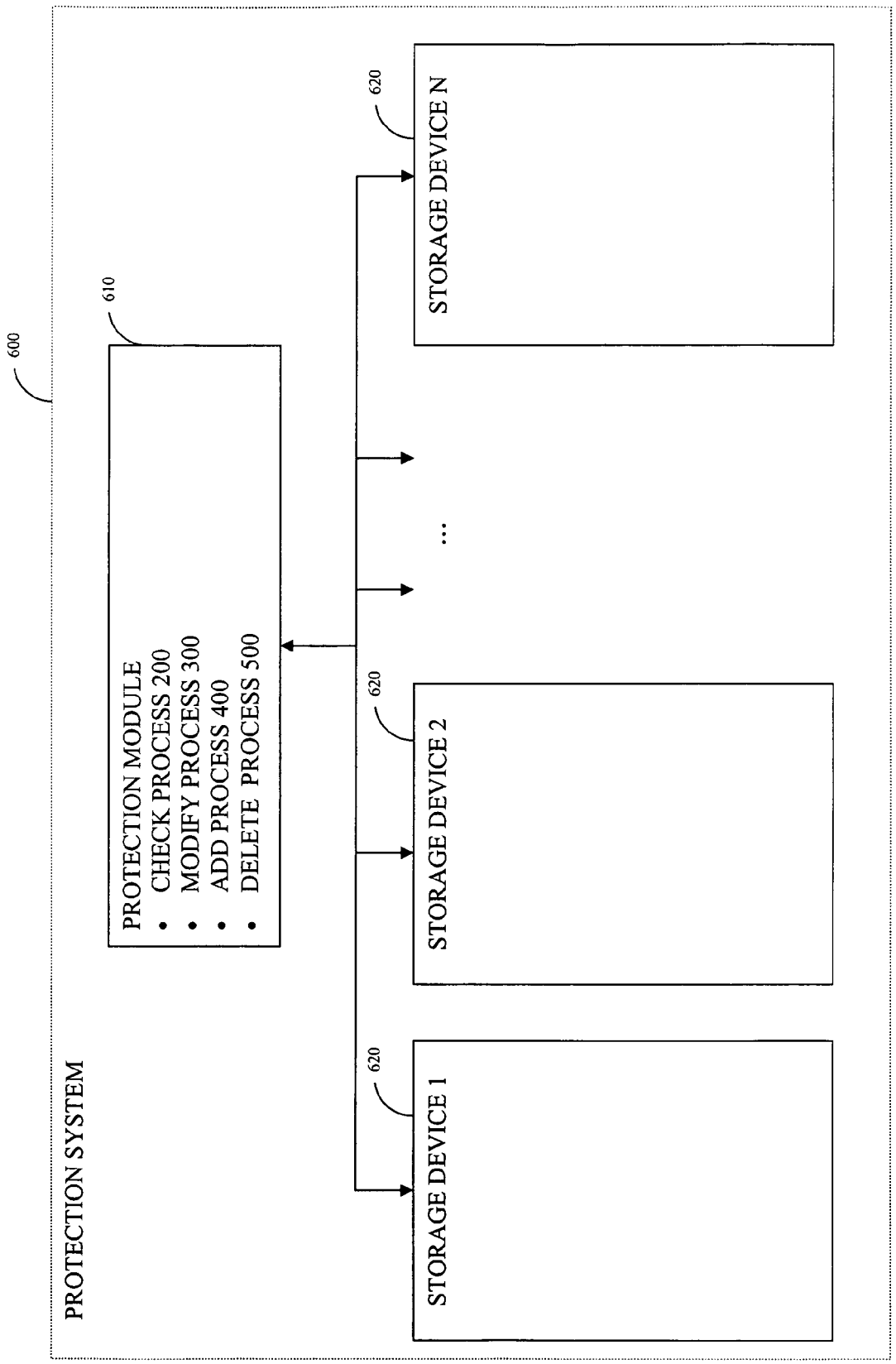
FIG. 6 illustrates one embodiment of a protection system.

FIG. 6 illustrates one embodiment of a protection system 600 which includes a protection module 610 in communication with a set of storage devices 620. In one embodiment, the protection module 610 includes the check process 200, the modify process 300, the add process 400, and the delete process 500.

It is recognized that the module may be located apart from the set of storage devices 620 and/or may be located on one or more of the storage devices 620. In other embodiments, one or more of these modules may be spread among the set of storage devices 620.

The protection module 610 communicates with the set of storage devices 620 using a variety of communication techniques that are well known in the art. Such communication may include local communication, remote communication, wireless communication, wired communication, or a combination thereof.

In one embodiment, the set of storage devices 620 may include any type of memory that allows for the storing of nodes, protection level information, and/or count information. In some embodiments, the storage device 620 retains data even after power is turned off, however, in other embodiments, the storage device 620 may be implemented using volatile memory. The storage devices 620 may be, for example, a standard hard drive, a cache, ROM, RAM, flash memory, as well as other types of memory as is know by those of ordinary skill in the art.

In some embodiments, the protection system 600 may be accessible by one or more other systems, modules, and/or users via various types of communication. Such communication may include, for example, the Internet, a private network for a hospital, a broadcast network for a government agency, an internal network of a corporate enterprise, an intranet, a local area network, a wide area network, and so forth. It is recognized that the protection system 600 may be used in a variety of environments in which data is stored. For example, the protection system 600 may be used to store records in a database, content data, metadata, user account data, and so forth.

In one embodiment, the protection system 600 runs on a variety of computer systems such as, for example, a computer, a server, a smart storage unit, and so forth. In one embodiment, the computer may be a general purpose computer using one or more microprocessors, such as, for example, a Pentium processor, a Pentium II processor, a Pentium Pro processor, a Pentium IV processor, an xx86 processor, an 8051 processor, a MIPS processor, a Power PC processor, a SPARC processor, an Alpha processor, and so forth. The computer may run a variety of operating systems that perform standard operating system functions such opening, reading, writing, and closing a file. It is recognized that other operating systems may be used, such as, for example, Microsoft® Windows® 3.X, Microsoft® Windows 98, Microsoft® WindowsMicrosoft®2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, or IBM® OS/2® operating systems.

As used herein, the word module refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is also recognized that in some embodiments, the systems and methods may be implemented as a single module and/or implemented in conjunction with a variety of other modules and the like. Moreover, the specific implementations described herein are set forth to illustrate, and not to limit, the present disclosure.

V. Example Environment

The following provides an example environment in which a distributed mirrored index tree may be used. It is recognized that the systems and methods disclosed herein are not limited to the example environment and that the example is only meant to illustrate embodiments of the invention.

A. Indexing Tree

In one embodiment, the indexing tree is an index tree wherein the copies of the nodes of the tree are stored across devices in a distributed system. The nodes of the indexing tree are stored using at least the same level of protection of data stored in the indexing data structure. In one embodiment, nodes that are stored on an offline device are restored, offline devices that come back online are merged into the distributed system and given access to the index tree, and the index tree is traversed to locate and restore nodes that are stored on offline devices. Additional description of an indexing tree structure is set forth in U.S. Patent Applications entitled "Systems and Methods for Maintaining Distributed Data," and "Systems and Methods for Updating Distributed Data," filed concurrently herewith, which are incorporated by reference above.

Figure 7:
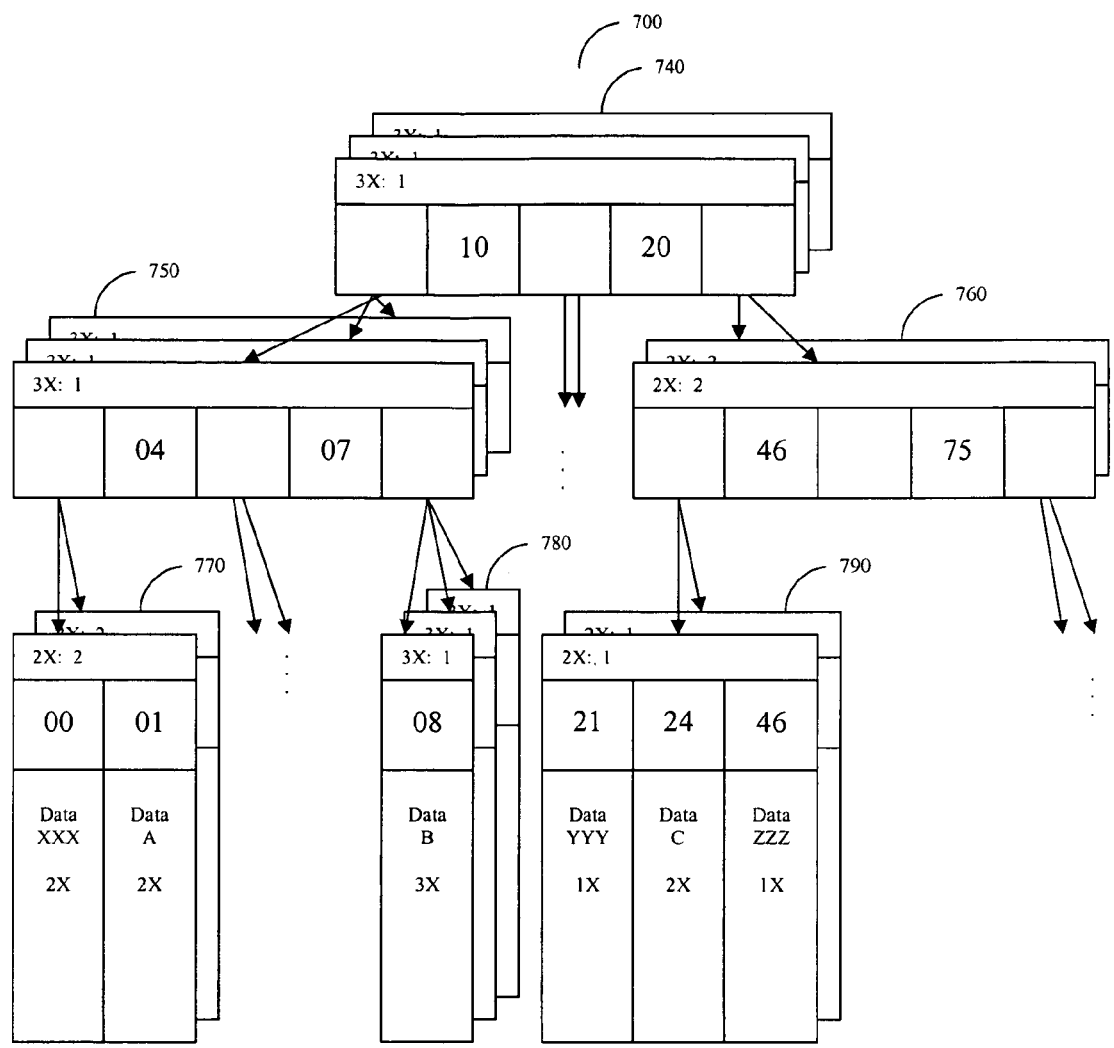
FIG. 7 illustrates one embodiment of a high-level block diagram of one embodiment of a mirrored index tree.

In one embodiment, data stored in the tree includes metadata that represents the protection level of the data. In addition, each node, including the root node, the internal nodes, and the leaf nodes, also includes protection information. FIG. 7 illustrates one embodiment of an index, where the index tree includes different mirroring levels, such that different nodes in the index tree are mirrored a different number of times. For example, Data B is stored with a protection level of 3×. Accordingly, the branches of the index tree 740, 750 that lead to Data B are also protected at a protection level of at least 3×.

1. Leaf Nodes

In the example, leaf node 770 has 2 copies, leaf node 780 has 3 copies, and leaf node 790 has 2 copies. In addition, the number of data entries that have the maximum level of protection for leaf node 770 is 2; the number of data entries that have the maximum level of protection for leaf node 780 is 1; and the number of data entries that have the maximum level of protection for leaf node 790 is 1.

2. Non-Leaf Nodes

In the example, the protection level of internal node 750 is MAX (Leaf Node 770, Leaf Node 780, Other Children Nodes)=MAX (2×, 3×, 2×)=3×; the protection level of internal node 760 is MAX (Leaf Node 790, Other Children Nodes) =MAX (2×, 2×)=2×; and the protection level of root node 740 is MAX (Internal Node 750, Internal Node 760, Other Children Nodes)=MAX (3×, 2×, 2×)=3×. In addition, the number of children that have the maximum level of protection for internal node 750 is 1; the number of children that have the maximum level of protection for internal node 760 is 2; and the number of children that have the maximum level of protection for root node 740 is 1.

Thus, the index information for each node is protected at least as much as the node's children. In addition, unnecessary replication is avoided. For example, only the nodes in the path to the data set that has a protection level 3× are copied three times, thereby saving on resources while maintaining the integrity of the data.

In one embodiment, the data in the indexing system is used to store identifiers for files and/or directories, and where the data entries provide the actual address of the metadata data structure, or inode, of the files and/or directories.

VI. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method of protecting data of variable protection levels, the method comprising:
   for each leaf node,
      determining a protection level for the leaf node; and
      determining the number of sets of data at the protection level of the leaf node;
   for each non-leaf node,
      determining a protection level for the non-leaf node based on a maximum of the protection levels of each child of the non-leaf node; and
      determining the number of children at the protection level of the non-leaf node;
   protecting each of the leaf nodes at the protection level determined for each of the leaf nodes; and
   protecting each of the non-leaf nodes at the protection level determined for each of the non-leaf nodes.

2. The method of claim 1 further comprising:
   for each of the leaf nodes, storing the number of sets of data at the protection level of the leaf node; and
   for each of the non-leaf nodes, storing the number of children at the protection level of the non-leaf node.

3. A method of protecting data of variable protection levels, the method comprising:
   for each leaf node,
      determining a protection level of each set of data stored in the leaf node; and
      determining a protection level for the leaf node;
   for each non-leaf node,
      determining a protection level of each child of the non-leaf node; and
      determining a protection level for the non-leaf node based on a maximum of the protection levels of each child of the non-leaf node;
   protecting each of the leaf nodes at the protection level determined for each of the leaf nodes; and
   protecting each of the non-leaf nodes at the protection level determined for each of the non-leaf nodes.

4. The method of claim 3 further comprising:
   storing the protection level of each of the set of data stored in the leaf nodes; and
   storing the protection level of each of the children of the non-leaf nodes.

5. A protection system for protecting data of variable protection levels, the system comprising:
   a set protection level module configured to:
      determine protection levels for each of a set of leaf nodes; and
      determine protection levels for each of a set of non-leaf nodes based on a maximum of the protection levels of children of each of the non-leaf nodes;
   an implement protection level module, in communication with the set protection level module, configured to:
      protect each leaf node at the determined protection level; and
      protect each non-leaf node at the determined protection level;
   a storage module, in communication with at least one of the set protection module and the implement protection level module, the storage module configured to:
      store a protection level indicator for each of the leaf nodes; and
      store a protection level indicator for each of the non-leaf nodes; and
   a count module configured to:
      determine a count of the sets of data at the protection level of each of the leaf nodes; and
      determine a count of the children at the protection level of each of the non-leaf nodes.

6. A protection system for protecting data of variable protection levels, the system comprising:
   a set protection level module configured to:
      determine protection levels for each of a set of leaf nodes; and
      determine protection levels for each of a set of non-leaf nodes based on a maximum of the protection levels of children of each of the non-leaf nodes;
   an implement protection level module, in communication with the set protection level module, configured to:
      protect each leaf node at the determined protection level; and
      protect each non-leaf node at the determined protection level;
   a storage module, in communication with at least one of the set protection module and the implement protection level module, the storage module configured to:
      store a protection level indicator for each of the leaf nodes;
      store a protection level indicator for each of the non-leaf nodes;
      store a count indicator representing the count of the sets of data at the protection level of each of the leaf nodes; and
      store a count indicator representing the count of the children at the protection level of each of the non-leaf nodes; and
   a memory device in communication with the storage module configured to store the protection level indicators.

7. A method of updating data of variable protection levels, the method comprising:
   determining a maximum protection level of an updated leaf node, wherein the updated leaf node comprises a plurality of data sets;
   protecting the updated leaf node at the maximum protection level;
   determining a count of data sets that are at the maximum protection level; and
   for each ascendant of the updated leaf node,
      determining a maximum protection level of each ascendant;
      determining a count of children of each ascendant that are at the maximum protection level; and
      protecting each ascendant at the maximum protection level.

8. The method of claim 7 further comprising:
   storing the determined maximum protection level of the updated leaf node; and storing the determined maximum protection level of each ascendant.

9. The method of claim 7 further comprising:
storing the determined count of data sets; and
storing the determined count of children of each ascendant that are at the maximum protection level.

10. A system for updating data stored using variable protection levels, the system comprising:
an update leaf module configured to:
determine a maximum protection level of an updated leaf node, wherein the updated leaf node comprises a plurality of data sets;
determine a count of data sets that are at the maximum protection level; and
protect the updated leaf node at the maximum protection level; and an update non-leaf module in communication with the update leaf module, the update non-leaf module configured to:
for each ascendant of the updated leaf node,
determine a maximum protection level of each ascendant;
determine a count of children of each ascendant that are at the maximum protection level; and
protect each ascendant at a protection level greater than or equal to the maximum protection level.

11. The system of claim 10 further comprising a storage device configured to store information about the determined counts.

\* \* \* \* \*

UNITED STATES PATENT AND TRADEMARK OFFICE
CERTIFICATE OF CORRECTION

| | | |
|---|---|---|
| PATENT NO. | : 7,551,572 B2 | Page 1 of 1 |
| APPLICATION NO. | : 11/256410 | |
| DATED | : June 23, 2009 | |
| INVENTOR(S) | : Passey et al. | |

It is certified that error appears in the above-identified patent and that said Letters Patent is hereby corrected as shown below:

On title page in page 3, column 2, line 20, under other publications, change "2006" to --2007--.

On title page in page 3, column 2, line 42, under other publications, change "Distribtued" to --Distributed--.

In column 5, line 4, change "12" to --120--.

In column 9, line 48, change "WindowMicrosoft®2000," to --Windows® 2000,--.

Signed and Sealed this

Sixteenth Day of March, 2010

David J. Kappos
*Director of the United States Patent and Trademark Office*